United States Patent [19]

Gorynin et al.

[11] Patent Number: 5,240,066
[45] Date of Patent: Aug. 31, 1993

[54] METHOD OF CASTING AMORPHOUS AND MICROCRYSTALLINE MICROWIRES

[75] Inventors: Igor V. Gorynin; Boris V. Farmakovsky; Alexander P. Khinsky; Karina V. Kalogina, all of Leningrad, U.S.S.R.; Alfredo Riviere V., Caracas, Venezuela; Julian Szekely, Weston; Navtej S. Saluja, Cambridge, both of Mass.

[73] Assignee: Technalum Research, Inc., Cambridge, Mass.

[21] Appl. No.: 766,034

[22] Filed: Sep. 26, 1991

[51] Int. Cl.$^5$ .................. B22D 11/00; B22D 19/08; B22D 19/14

[52] U.S. Cl. .................... 164/461; 164/462; 164/486; 164/91; 65/3.2

[58] Field of Search ........... 164/423, 461, 462, 444, 164/486, 91, 46; 65/3.2

[56] References Cited

U.S. PATENT DOCUMENTS

| | | | |
|---|---|---|---|
| 3,256,584 | 6/1966 | Parkhachev | 164/267 |
| 3,481,390 | 12/1969 | Veltri et al. | 164/461 |
| 3,607,201 | 9/1971 | Zaberovsky | |
| 3,651,301 | 3/1972 | Menchikov et al. | |
| 3,856,513 | 12/1974 | Chen et al. | 164/463 |
| 4,523,621 | 6/1985 | Ray | 164/475 |
| 4,614,221 | 9/1986 | Masumoto et al. | 164/462 |
| 4,861,751 | 8/1989 | Tenhover | 164/463 |

FOREIGN PATENT DOCUMENTS 1496535 10/1969 Fed. Rep. of Germany.

Primary Examiner—Richard K. Seidel
Assistant Examiner—Erik R. Puknys
Attorney, Agent, or Firm—Choate, Hall & Stewart

[57] ABSTRACT

A method for preparing glass-coated microwires is provided. A metal in a glass tube is superheated in a high frequency induction field, whereby the glass tube softens. A thin capillary tube is drawn from the softened glass and the glass tube fills with molten metal. The metal-filled capillary enters a cooling zone in the superheated state and the rate of cooling is controlled such that a microcrystalline or amorphous metal microstructure is obtained. The cooling zone includes a stream of cooling liquid through which the capillary passes. The microstructure of the microwire is controlled by choice of amorphisizers, cooling rate, nature of the cooling liquid, location of the cooling stream, dwell time in the cooling stream and degree of superheating and supercooling of the metal.

29 Claims, 2 Drawing Sheets

METHOD OF CASTING AMORPHOUS AND MICROCRYSTALLINE MICROWIRES

BACKGROUND OF THE INVENTION

This invention relates to the production of glass-insulated microwire with amorphous or microcrystalline microstructure.

A method for casting microwires in glass insulation is disclosed in U.S. Pat. No. 3,256,584 in which the charge metal and glass are melted by means of a high field inductor, after which a metal-filled capillary is drawn and collected onto a receiving bobbin. However, the issue of controlling the microstructure of the final wire has not been addressed.

Amorphous metals have no grain boundaries, can be readily doped, have a zero-temperature dependence of resistivity and possess good electrical and magnetic properties. Amorphous and microcrystalline microwires provide substantial improvements of certain properties compared to wires of similar compositions having equilibrium crystalline structures. Microcrystalline metals often have intermediate properties of amorphous and crystalline metals. The electrical resistance of the amorphous wires increases from 160 K$\Omega$/m up to 2500 K$\Omega$/m, and it becomes possible to obtain both positive and negative thermal coefficient of resistance. In the case of magnetically soft amorphous microwires, the initial magnetic permeability increase 5-7 times, and can reach 20×10$^3$. The mechanical strength of these amorphous microwires increases.

Microcrystalline and amorphous microwires are well suited for applications such as sensors of temperature, static and dynamic pressure, velocity and liquid or gas consumption.

It is the object of the present invention to prepare amorphous or microcrystalline glass-insulated microwires.

SUMMARY OF THE INVENTION

In one aspect of the invention, a glass-coated microwire with an amorphous metal core is prepared by providing a glass tube containing the desired metal and melting the metal in a high frequency induction field. The heat of the metal softens the glass tube and a thin capillary is drawn from the softened glass tube. If the metal wets the glass surface, a metal-filled capillary tube results. The rate of cooling is controlled such that an amorphous microstructure is obtained for the metal.

In another aspect of the invention, a glass-coated microwire with a microcrystalline metal core is prepared by providing a glass tube containing the desired metal and melting the metal in a high frequency induction field and further heating the melted metal so that it becomes super heated. The heat of the metal softens the glass tube and a thin capillary is drawn from the softened glass tube. If the metal wets the glass surface, a metal-filled capillary tube results. The metal-filled capillary enters a cooling zone in a superheated state where it is rapidly cooled such that the desired amorphous or microcrystalline microstructure is obtained.

Rapid cooling is typically required to obtain amorphous and microcrystalline microstructures. The rate of cooling is not less than 10$^4$° C./sec and preferably is 10$^5$°-10$^6$° C./sec. The amorphous or microcrystalline structure is controlled by choice of amorphisizers, cooling rate, nature of the cooling liquid, location of the cooling stream, dwell time in the cooling stream and degree of superheating and supercooling.

Another aspect of the invention is a glass-coated microwire with a metal core having either a microcrystalline or amorphous microstructure prepared according to the method of the invention.

DESCRIPTION OF THE PREFERRED EMBODIMENT

The present invention as herein described relates to a method for preparing microcrystalline and amorphous glass-insulated microwires. The general method is known in the art and has been described in U.S. Pat. No. 3,256,584. The present invention is distinguished from the art in that means for controlling the microstructure of the wire disclosed.

Figure 1:
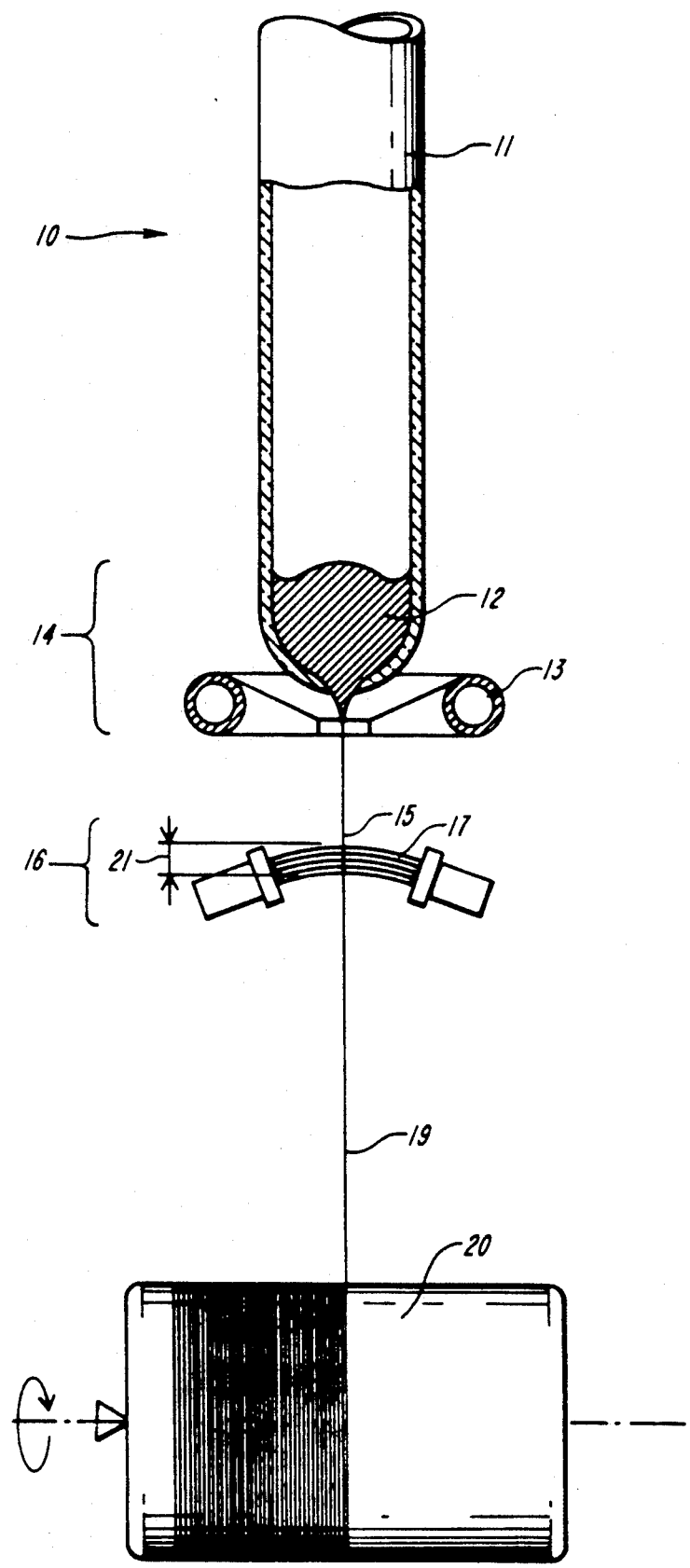
FIG. 1 shows a diagram of the apparatus used in the practice of this invention.
Figure 2:
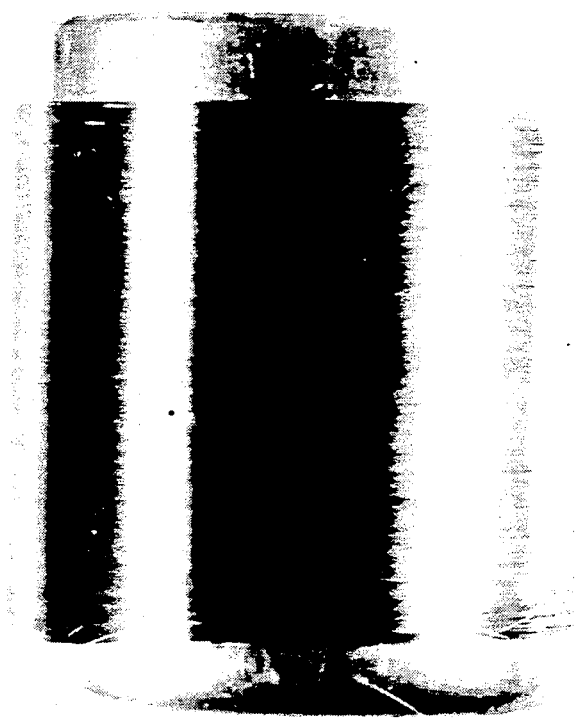
FIG. 2 is a photograph to scale showing microwire prepared according to the method of the invention.

Referring to FIG. 1, a method of producing amorphous and microcrystalline microwires using an apparatus 10 is described. A glass tube 11 is changed with a metal 12 and the tip of the tube 11 is introduced into the field of an induction coil 13. A heating zone 14 contains the glass tube 11, metal 12 and the high frequency induction coil 13. The high frequency coil 13 melts and superheats the metal 12 in tube 11. The heat generated softens the tip of the glass tube 11. A glass capillary 15 is drawn from the softened glass. If the metal can wet the surface of the glass, the capillary 15 is filled with metal. The capillary exits the heating zone 14 and enters the cooling zone 16 which contains a cooling liquid 17. The metal filled capillary 15 enters into a stream 18 of cooling liquid 17 where it supercools and solidifies and is collected as a microwire 19 on a receiving spool 20. FIG. 2 is a photograph to scale showing the microwire prepared according to the method of the invention.

Rapid cooling is typically required to obtain amorphous and microcrystalline microstructures. The rate of cooling is not less than 10$^4$° C./sec, and preferably is 10$^5$°-10$^6$° C./sec. The amorphous or microcrystalline structure is controlled by choice of amorphisizers, cooling rate, nature of the cooling liquid, location of the cooling stream, dwell time in the cooling stream and degree of superheating and supercooling.

The metal 12 is superheated while in the glass tube 11 in the high frequency induction field. The metal is superheated to preferably 100°-400° C., and more preferably to 250°-350° C., above its liquids temperature T$_{liquidus}$. Heating the metal 12 above T$_{liquidus}$ results in a steeper cooling curve and promotes amorphization of the metal. Supercooling occurs when the superheated metal-filled capillary 15 enters a stream of cooling liquid 17 in the cooling zone 16. Amorphous structure will exist when the rate of crystal growth, $v_1$ is less than the rate of heat loss, $v_2$. When $v_1 << v_2$, the metal will supercool and this promotes the formation of the amorphous structure. The extent of cooling is controlled in part by the part length 21 of the cooling of liquid 17. The cooling stream 18 has a variable path length and is preferably greater than 3 mm long and more preferably 5-7 mm long. The cooling liquid can be any liquid, but is preferably water, transformer oil, silicon organic liquids, and liquid nitrogen.

The cooling zone 16 is variably positioned a distance from the heating zone 14. The distance influences the degree to which the metal-filled capillary 15 is superheated. The further the distance between the two zones, the greater the heat loss before entering the cooling zone. The cooling zone 16 is preferably less than 100 mm, and more preferably 40-50 mm, from the heating zone. The microwire 19 solidifies in the cooling zone and upon exiting, is supercooled at least 20° C. below its melting temperature, $T_{liquidus}$. Preferably, the microwire is supercooled 40°-60° C. below $T_{liquidus}$.

The dwell time of the microwire in the cooling zone 16 is adjusted so as to promote the amorphous or microcrystalline microstructure in the wire. Sufficient time in the cooling zone is required to completely cool the wire below $T_{liquidus}$. The microwire is preferably drawn at a speed of preferably not less than 150 m/min, and more preferably 300-500 m/min, through the cooling zone.

The composition of the metal is controlled so as to promote amorphization. Metals used in the practice of the invention are any metal, particularly any transition metal or Group IIIa or IVa metal and their alloys. Additives are used with the above metal to promote amorphization. Possible additives include phosphorous, boron, silicon, zinc and rare earth metals which are added to the metal preferably in the range of 3 to 10 wt %, and more preferably 6 to 8 wt %.

The diameter of the microwire influences the final microstructure because the rate of heat loss, $v_2$, changes with diameter. Microwires greater than 40 μm in diameter are usually microcrystalline. Microwires less than 10 μm are usually amorphous. Microwires in the range of 40 to 10 μm will have a microstructure strongly influenced by the processing parameters. For example, increasing the additive load in the metal, lengthening the cooling stream path length, reducing the distance between the cooling and heating zones and increasing the degree of superheating and supercooling of the metal all promote an amorphous microstructure in a 20 μm diameter wire.

The glass coating solidifies before the metal core as the wire passes through the cooling zone. When cooling is rapid, the metallic core is in a strained state of extension and the glass coating is in a state of compression. The strain is induced by the differences in the coefficients of thermal expansion of glass and metal. The molten metal tries to contract on cooling but is constrained by the already solidified glass. Resistance, mechanical strength and magnetic properties actually benefit from this situation.

In a typical example, a glass tube used in the preparation of microwires had the following dimensions: inner diameter of 5-15 mm, preferably 9-12 mm; wall thickness of 0.8-2 mm, preferable 1-1.2 mm. The glass must be of a very high purity to prevent hairline cracks and have a melting point comparable to the melting point of the metal used in the experiment. When high melting point metals were used, glasses with high softening temperatures ($T_{softening}$), i.e., high silicon content, were needed.

In a typical example, 3-20 g and preferably 5-9 g of a Ni-Cr-Si-Ce alloy were added to a glass tube with the dimensions described above. The alloy had a $T_{liquidus}$ of 1320° C. The metal was heated in a high field inductor to 260°-280° C. above $T_{liquidus}$, that is to 1600° C. A capillary tube was drawn from the heating zone at a rate of 750 m/min. The cooling zone was positioned 10 mm from the heat zone. The cooling liquid was water. Liquid nitrogen as the cooling liquid was also used, however, no change in the microstructural properties of the wire were noted. The width of the cooling stream was 5 mm. The metal was supercooled 32°-38° C. The resulting microwire was amorphous in structure and had a diameter of 3-5±12% μm.

A 0.5 μm thick amorphous wire prepared according to the method of the invention had a resistance of 2.5 MΩ/m by the practice of this invention. In comparison, a 20 μm thick crystalline microwire has a resistance of 150 KΩ/m.

What is claimed is:

1. The method for preparing glass-coated microwires comprising the steps of:

providing a glass tube containing metal;

melting said metal in a high frequency induction field heating zone and further superheating said melted metal, whereby the heat generated from said superheated metal softens said glass tube;

drawing a thin capillary tube from said softened glass tube whereby said superheated metal fills said capillary tube;

positioning a cooling zone at a distance of greater than 10 mm zone, said distance providing contact time between said capillary tube and said superheated metal prior to entering said cooling zone sufficient to provide mechanical and metallurgical contact between said capillary tube and said superheated metal;

introducing said metal-filled capillary into said cooling zone in a superheated state, such that said metal-filled capillary passes through said cooling zone without substantial deflection;

controlling the rate of cooling of said metal-filled capillary such that a microcrystalline microstructure is obtained and a microwire comprising a glass-coated microcrystalline metal is formed.

2. The method for preparing glass-coated microwires comprising the steps of:

providing a glass tube containing metal;

melting said metal in a high frequency induction field heating zone; further superheating said melted metal, whereby the heat generated from said melted metal softens said glass tube;

drawing a thin capillary tube from said softened glass tube whereby said superheated metal fills said capillary tube;

positioning a cooling zone at a distance of greater than 10 mm from said heating zone, said distance providing contact time between said capillary tube and said superheated metal prior to entering a cooling zone sufficient to provide mechanical and metallurgical contact between said capillary tube and said superheated metal;

introducing said metal-filled capillary into said cooling zone in a superheated state, such that said metal-filled capillary passes through said cooling zone without substantial deflection;

controlling the rate of cooling of said metal-filled capillary such that an amorphous microstructure is obtained and a microwire comprising a glass-coated amorphous metal is formed.

3. The method of claim 1 or 2 wherein said metal is superheated to a temperature 100° to 400° C. above its liquidus temperature.

4. The method of claim 1 or 2 wherein said metal is superheated to a temperature 250° to 350° C. above its liquidus temperature.

5. The method of claim 1 or 2 wherein the path length of said glass capillary through said cooling zone is greater than 3 mm.

6. The method of claim 1 or 2 wherein the path length of said glass capillary through said cooling zone in the range of 5 to 7 mm.

7. The method of claim 1 or 2 wherein said cooling zone comprises cooling liquid selected from the group comprising water, transformer oil, silicon organic liquids and liquid nitrogen.

8. The method of claim 1 or 2 wherein said cooling zone is positioned a distance from the heating zone such that the metal-filled capillary enters said cooling zone at a temperature in a superheated state.

9. The method of claim 8 wherein said cooling zone is positioned less than 100 mm from the heating zone.

10. The method of claim 8 wherein said cooling zone is positioned 40 to 50 mm from said heating zone.

11. The method of claim 1 or 2 wherein the rate of cooling is not less than $10^4$° C./sec.

12. The method of claim 1 or 2 wherein the rate of cooling is $10^5$–$10^6$° C./sec.

13. The method of claim 1 or 2 wherein the degree of supercooling of said microwire after leaving said cooling zone is at least 20° C. below $T_{liquidus}$.

14. The method of claim 1 or 2 wherein the degree of supercooling of said microwire after leaving said cooling zone is at 40°–60° C. below $T_{liquidus}$.

15. The method of claim 1 or 2 wherein said metal comprises elements selected from the group containing transition metals and their alloys.

16. The method of claim 1 or 2 wherein said metal comprises elements selected from Group IIIa and Group IVa metal and their alloys.

17. The method of claim 1 or 2 wherein said metal additionally comprises additives which promote amorphization.

18. The method of claim 17 wherein said additives are selected from the group containing P, B, Si, Zr and rare earth metals.

19. The method of claim 17 wherein said additives in said metal is in the range of 3 to 10 wt %.

20. The method of claim 17 wherein said additives in said metal is in the range of 6 top 8 wt %.

21. The method of claim 1 or 2 wherein the dwell time in said cooling zone is controlled so as to promote an amorphous or microcrystalline microstructure in the microwire.

22. The method of claim 21 wherein the speed of the microwire through said cooling zone is greater than 150 m/min.

23. The method of claim 21 wherein the speed of the microwire through said cooling zone is 300–500 m/min.

24. The method of claim 1 or 2 wherein said metal core is in a strained state of extension and said glass coating is in a strained state of compression resulting from the differences on coefficients of thermal expansion and high quenching speeds.

25. The method of claim 24 wherein said compression is greater than 20 kg/m$^2$.

26. The method of claim 24 wherein said compression is 30–40 kg/mm$^2$.

27. The method of claim 1 wherein the microcrystalline structure of the wire is controlled by choice of amorphisizers, cooling rate, nature of the cooling zone, location of the cooling zone, dwell time in the cooling zone and degree of superheating and cooling.

28. The method of claim 2 wherein the amorphous structure of the wire is controlled by choice of amorphisizers, cooling rate, nature of the cooling zone location of the cooling zone, dwell time in the cooling zone and degree of superheating and cooling.

29. The method of claim 1 or 2 wherein the diameter of the final microwire is 0.5–40 μm.

* * * * *